United States Patent Office 3,681,054
Patented Aug. 1, 1972

3,681,054
METHOD FOR SELECTIVE REDUCTION OF A PAIR OF METAL SALTS CLOSELY ADJACENT IN THE ELECTROMOTIVE SERIES FROM SOLUTION IN THE FORM OF METAL POWDER WITH THE AID OF A REDUCING GAS
Rolf Einar Malmstrom and Tapio Kalevi Tuominen, Pori, Finland, assignors to Outokumpu Oy, Outokumpu, Finland
No Drawing. Filed June 29, 1970, Ser. No. 50,993
Claims priority, application Finland, July 9, 1969, 2,044/69
Int. Cl. C22b 23/04
U.S. Cl. 75—108    7 Claims

ABSTRACT OF THE DISCLOSURE

Metals close to each other in the electromotive series are separated from a solution by forming halide complexes of the metals to be reduced, adjusting the pH so acidic that only the most unnoble metal can be reduced by introducing a reducing agent at elevated temperature and simultaneously optionally neutralizing the acid formed. The reduced metal precipitate is recovered and then the pH is raised until the second least noble metal starts to be reduced, etc. Chloride is preferably used as the halide.

BACKGROUND OF THE INVENTION

Field of the invention

The present invention relates to a method for selective reduction of a pair of metal salts closely adjacent in the electromotive series from solution in the form of metal powder with the aid of a reducing gas.

Description of the prior art

Many metals can be reduced from their salt solutions with the aid of a reducing gas at elevated temperature and pressure. When the solution contains only one reducible metal ion, it is usually rather easy to control the conditions, and the reduced metal is mostly comparatively pure and the yield is good.

When simultaneously several metal ions are present in the solution which may be reduced with the aid of the reducing gas employed, achievement of sufficient selectivity necessitates often in practice very accurate control of the reducing conditions, and sufficient purity is not obtained by one precipitation in spite of such efforts. Essential factors in the reduction process include temperature, gas pressure, composition of the solution and the pH range in which the reduction is carried out. Selectivity is based, in the first place, on the reduction pH value characteristic of each metal, when the temperature and pressure have correspondingly appropriate values, which in their turn depend upon the reducing gas employed, which may be, e.g., $H_2$, $CO$ or $SO_2$.

The greatest inconvenience in methods employed up to date has provided to be the task of keeping the reduction pH during the course of reduction exactly enough at the correct point, because there is very little latitude before already the other metal begins to precipitate.

When the concentration of the reducible metal ion goes down far enough, the activity relations in the reducing range change so that such a metal ion present in high concentration the reducing pH range of which is close to the metal ion that has already been reduced up to the final stage, begins in fact to be reduced along with the other. A common procedure employed in order to prevent this is to leave in the solution such an amount of the ion that is being reduced that no other ion is as yet reduced along with it.

When the precipitation is further continued, an intermediate product is at first obtained which contains both metals; only afterwards is the second metal obtained in the form of a pure powder. The amount of this powder produced as intermediate can be lowered by means of careful control of conditions and of pH, as well as some other expedients, and reasonable selectivity can be achieved.

In most instances, however, the purity requirements are such that one is compelled to turn out mixed powders, and these have to be redissolved and the solution thus obtained has to be returned to the initial phase of the process.

The methods employed in reduction may be divided according to the reducing pH range into two main groups, in one of which an alkaline pH range (over 7) is used and in the other, an acid pH range (less than 7).

1. The methods in which the reduction is performed from strongly ammoniacal solution, whereby with the aid of ammonia from the metal ion an ammonium complex has been formed, which prevents precipitation of the metals in the alkaline pH range. Without complex formation, the metals would precipitate as hydroxides.

2. The methods in which reduction is accomplished in the acid pH range and the hydrogen ion concentration produced in association with reduction is continuously adjusted in some appropriate manner in order to keep the pH in the proper range.

It may be mentioned with respect to reduction from ammoniacal solution that nickel as well as cobalt both form $NH_3$ complexes, and this circumstance is utilized for their separation by selective reduction. In this instance the selectivity is not based on different reduction pH value but on the fact that the nickel-ammine complex exhibits, reaction-kinetically, far greater speed of reduction than the corresponding cobalt compound.

On the basis of reaction equilibrium, both Co and Ni are reduced, e.g., with hydrogen from the solution in question, and the selectivity of reduction may be influenced by chosing proper temperatures and pressures. Reduction of a cation complex is involved, since the charge of the metal ion does not change in connection with the complex formation, while $NH_3$ has no charge.

On the other hand in connection with cobalt and nickel, formation of the ammine complexes exerts an influence on the potential difference prevailing between the ions in the solution, in a direction which is unfavourable from the viewpoint of selective reduction, this effect being less with lower ammines and stronger with high ammines. For instance, in pure salt solution the potentials are: divalent Ni= +0.231 volt and divalent Co= +0.278 volt, or difference Ni-Co= −0.047 volt, while for the ammine complexes correspondingly $Ni(NH_3)_6^{++}$= +0.49 volt and $Co(NH_3)_6^{++}$= +0.42 volt, whereby the difference Ni-Co= +0.07 volt, which means that in one of these instances cobalt and in the other nickel is nobler. It is true that the potential difference is increased, but this cannot be utilized because according to this difference cobalt should precipitate first, but in actual fact nickel does precipitate first, owing to kinetic factors.

The selectivity in connection with the use of ammine complexes is thus based on kinetic factors, and the ammine complexes have merely the purpose to increase the solubility of the metal ions in question at higher temperature, since, e.g., the $CoSO_4 \cdot H_2O$ solubilities would otherwise confine the reducing temperatures that are usable to be lower than 160° C.

Of the methods operating in this range, those disclosed in the U.S. Pats. 1,686,391 and 2,694,006 may be mentioned. It is stated in the latter patent (column 7, lines 11–21) that the anion in an ammoniacal solution may be, sulphate, nitrate, partly or totally chloride, phosphate, acetate or another anion which does not react with the reducing gas or form non-dissociable complexes, such as cyanide. In addition in claim 12 it has merely been said that the solution is a sulphate solution.

In reductions carried out in the acid pH range the metal to be reduced may be present as the salt of any such acid (e.g., $H_2SO_4$, $HNO_3$, HCl, etc.) which at the temperatures and pressures involved does not form any interferring precipitations or prevent the formation of complexes which may possibly be desired.

During the course of reduction, the hydrogen ion concentration of the solution continuously increases and, when sufficiently high, it inhibits further reduction. This introduces the necessity of continuous neutralizing, by the aid of which the pH value is maintained at the correct level. Neutralization is accomplished by adding a suitable agent, e.g., ammonia, alkali or equivalent, at an appropriate rate in the course of reduction.

Neutralization may also be effected in that the metals to be reduced are first precipitated from the initial solution as oxides, hydroxides, carbonates or equivalent salts. The precipitate thus obtained is then treated under appropriate conditions with a reducing gas so that a metal powder is achieved. The initial solution from which the first precipitation is effected may be any solution containing such anion from which the desired compound can be produced. As examples of these methods there may be mentioned e.g. the U.S. Pats. 2,744,003, 2,803,149 and 2,694,005.

In the last-mentioned patent, selective reduction of nickel and cobalt, in the acid pH range is carried out, using ammonia for neutralization. The anion forming the salt is in this case sulphate, because dissolution of the metal has been accomplished with the aid of sulphuric acid, and the ammonium sulphate formed on neutralization is easy to crystallize from the residual solution.

According to U.S. Pat. 2,694,005, also other polybasic inorganic acids may be used, such as phosphoric acid etc., in which one of the two hydrogen ions is less dissociable than the corresponding ion in sulphuric acid.

However, it is far more difficult to prevent the precipitation of salts of the other above-mentioned acids in reduction conditions, and in practice only $H_2SO_4$ has come into question.

Strongly dissociated monobasic inorganic acids such as hydrohalides and nitric acid ($HNO_3$) are not advantageous for the use in this process (see U.S. Pat. 2,694,005, column 3, lines 22-44).

In the method according to the British Pat. No. 757,323 a cationic amine complex, of $[Me_x(AM)_4]^{++}$ type, is used in reduction of metals from slightly acid solution. According to this patent it is also possible to use solutions containing anion complexes of type $(Ac_xMe_y)$, where Ac is an acid radical (patent, page 3, lines 5-19). Later (lines 31-37) it is said, however, that the anions which may come into question in practice are rather limited. For instance, in basic solution only sulphate and carbonate and in acid solution, sulphate, fluosilicate or acetate.

Without formation of complexes, it is possible e.g. in selective reduction of divalent Ni and Co ions to achieve in the Co/Ni ratio of the solution, theoretically, a value of about 100, which is thermodynamically determined directly from the potential difference of the ions in question in the solution. By cementing the nickel from the solution with cobalt powder, the same ratio is attained.

The selectivity may be improved by the aid of factors of reaction kinetics; because the rate of reduction of nickel is much higher than that of cobalt, the pH may be permitted to rise in the final reduction of nickel into the pH range of cobalt, provided that the reduction is discontinued in time so that cobalt cannot yet be reduced along with it. The selectivity prevailing with pure metal ions in equilibrium states can only be influenced by means of pH control (Schaufelberger, Roy; Separation of Cu, Ni and Co by selective reduction from aqueous solution. Bulletin of IMM 64 (1954-55) No. 581).

Concerning selective separation of nickel and cobalt it is said in U.S. Pat. No. 2,694,005, column 4, lines 25-38, e.g.: "It is first necessary to adjust the hydrogen ion concentration to such level at which cobalt is not yet normally reducible with gas. Secondly, because this corresponds to an acid concentration higher than that acidity at which the $Ni^{++}$ ion is reducible to metal from aqueous solution of a nickel salt, one has to add to the solution a component forming such a nickel complex which is reduced at a hydrogen ion concentration of such height that the cobalt still remains in solution. In addition, an appropriate substance (neutralizer) is required to compensate for the hydrogen ion produced at nickel reduction, in order that the increase of acid concentration might not stop the reduction of nickel." Further in the specification, column 4, lines 73-85 and column 5, lines 1-2: "The action of the electrolyte at this point is not understood in detail. It may be that in the presence of acid an anionic complex $Me(An)_x$ is formed, in which Me is nickel or cobalt and An is an anion radical. The anion complex would thus be more easily reducible than the metal ion. Addition of anion to the solution may perhaps act in the way that dissociation of the acid which is produced is impeded, or in fact non-dissociable acid molecules are formed. Ammonium sulphate, being a salt of a dibasic acid which has relatively low dissociation in respect of the first hydrogen, seems to satisfy best all the conditions in this regard."

Earlier it has been said, however, that strongly ionized inorganic acids, such as hydrohalides, are not usable (U.S. Pat. 2,694,005, column 3, lines 37-40).

SUMMARY OF THE INVENTION

According to the invention an excess of halide, in relation to the stoichiometry of the metals, is added to the solution to form halide complexes of the metals. The least noble metal is reduced with a reducing agent at elevated temperature. If any acid is formed this is neutralized to maintain the adjusted pH in the solution at the level at which only the least noble metal can be reduced. The reduced metal precipitate is recovered and the pH is raised to reduce the second least noble metal in the solution etc.

DESCRIPTION OF THE PREFERRED EMBODIMENT

In the method according to the present invention, reduction of two metal ion pairs which lie close together in the electromotive series in respect of their oxidation and reduction potentials is selectively accomplished from solution by means of a reducing gas, utilizing a suitable means of influencing the shaft of the critical reducing pH range of one or both metals of this metal pair in such manner that the difference in reduction potential between these metals increases.

According to the invention, selective reduction of the pair of metals is accomplished from a solution containing halides, the halide concentration of which is higher than would be consistent with the corresponding stoichiometry of the metals to be reduced. It is then desired to produce chloride complexes of the pair of metals in question $(McCl_n)^{2-n}$ or $[Me(H_2O)_{4-n}Cl_n]^{2-n}$, e.g., $(CoCl)^+$, $(CoCl_2)aq$, $(CoCl_3)^-$, $(CoCl_4)^{-2}$, and corresponding nickel complexes.

It has been found that the chloride complexes then increase the selectivity of reduction by widening the range between the critical pH values which are essential for reduction. This is accomplished by adding to the halide salt solution of the metal pair in question such halide salt which does not affect the conditions of reduction on the side of the cation. Such salts are, e.g., alkaline earth and alkali metal chlorides (e.g., $CaCl_2$, NaCl). On the side of halide salts one may also use the corresponding hydrohalide acids, provided that care is taken to preserve an appropriate pH range by neutralization.

When the Co-Ni pair is concerned, one achieves with chloride addition the result that cobalt, when it is bound in the chloride complex, becomes less noble and the critical pH value for reduction shifts into more alkaline (or less acid) direction, and while the corresponding pH value of nickel remains unchanged, the difference thus increases. The change is always similar in kind when different halides are used, because the cobalt complexes are more easily formed than the corresponding nickel complexes.

It has been found that the halide concentration has to be several moles per litre, e.g., Cl content=3 mol/l., whereby the maximum of selectivity is obtained.

Cobalt forms, for instance, more numerous chloride complexes of different grade than nickel. With increasing chloride content, the higher complexes become more stable, and it has been clearly observed in selective reduction tests carried out with different chloride concentrations that the critical pH ranges change with changing Cl content. With 1.5–2.5 mol/l. Cl content the critical pH values of the complexes are highest, that is the complexes are the most active.

The critical pH range in which nickel can be selectively reduced from chloride solution containing Co, is 2.5 to 3 pH units when the Cl content is $\geq$ 2 mol/l. and the cobalt content about 1 mol/l. Correspondingly, in sulphate solution the equivalent range is about one pH unit. The widening of the pH range of the Co-Ni metal pair thus achieved enables such high selectivity to be attained in the reduction of nickel that the Co/Ni ratio in the final solution is 10,000, or 100-fold compared to previous results.

For chloride addition, for instance, one may advantageously use calcium chloride ($CaCl_2$), the solubility in water is sufficient under the conditions implied by the reduction; and correspondingly also other halides which satisfy the above mentioned solubility requirements are usable, of course.

For the neutralization to be carried out in connection with the reduction one has to use an agent the cation of which does not interfere with the reduction and the halide of which has sufficient solubility under the conditions in question. Such neutralizing agents may be e.g. $CaO$, $Ca(OH)_2$, $NaOH$, $NH_4OH$ or the hydroxides of the metals in question.

When the reduction is carried out in such a pH range in which one of the metals of the pair is reduced and the pH range employed is then below the critical pH range of the metal which is not reduced, the acid produced at reduction has to be continuously neutralized in order that the difference between the critical pH range, which is indispensable in view of selectivity from the very start, might remain as large as possible throughout the reduction process.

EXAMPLE 1

Nickel and cobalt were selectively reduced from chloride solution. The reduction was carried out in a 3.78 litre autoclave, at 190° C. and at 30 kilopound partial pressure of hydrogen.

The initial solution had the following composition:

Co 60 g./l., Ni 30 g./l., Ca 40 g./l., Cl− 178 g./l.

The quantity of solution was 2.5 litres To the initial solution 125 g of nickel powder were added to serve as reduction nuclei.

Reduction procedure

The initial solution and nickel powder are placed in the autoclave. The autoclave is closed and flushed with nitrogen. The solution temperature is raised to 190° C. Hydrogen is conducted into the autoclave, the hydrogen partial pressure to become 30 kp./cm.$^2$ and the total pressure, 42.5 kp./cm.$^2$. After the reduction of nickel has come under way, the pH of the solution goes down. The reduction stops in the critical pH range for the reduction of nickel. Reduction goes on when the free HCl that is formed is neutralized. In the example reduction, neutralization was accomplished by adding NaOH into the autoclave.

NaOH is added in equivalent quantity corresponding to the metal in the solution. On conclusion of the reduction of nickel, the pH rises to 4.0–4.2. In this range cobalt is not reduced in the solution in question. The reduction time is 2 hours. The solution is removed from the autoclave and filtered. The filtrate contains Co 58 g./l. and Ni 56 mg./l. The Co/Ni ratio of the solution is about 1000. The precipitate is washed with distilled water. The cobalt content of the precipitate is 0.53%, corresponding to 1.4% Co in the reduced Ni+Co powder. The filtrate obtained in the nickel reduction is reduced under the same conditions under which the nickel was reduced.

The amount of NaOH required for neutralization is consistent with the cobalt content of the solution. In the cobalt reduction nickel is obtained among the reduced cobalt in the amount of 0.1%, which is consistent with the Co/Ni ratio of the solution subjected to reduction. The cobalt reduction time is 1.5 hours.

EXAMPLE 2

Reduction temperture: 190° C.
Pressure: $p(H_2)=30$ kp./cm.$^2$
Solution to be reduced:
    Co=29 g./l.
    Ni=29 g.l.
    Ca=20 g./l.
    Cl=106 g./l.

Reduction is carried out, at first, in the same autoclave as in Example 1. As neutralizing agent NaOH is used. For selective reduction of nickel, the pH is controlled so that after completion of the reduction of nickel the pH value rises up to 4.5–4.8. Under these conditions the nickel is reduced so that the nickel content in the solution will be 25 mg./l. The cobalt content is 27 g./l.

In the reduced Ni+Co powder there is 1.5% Co. Reduction of cobalt is performed in the pH range pH >5.0. The Ni content of the cobalt powder obtained is 0.1%.

EXAMPLE 3

Reduction temperature: 190° C.
Pressure: $p(H_2)=30$ kp./cm.$^2$
Solution to be reduced:
    Co=29 g./l.
    Ni=29 g./l.
    Ca=20 g./l.
    Cl=106 g./l.

The reduction is carried out in the same autoclave as in Example 1. NaOH is used as neutralizing agent. The volume of the solution to be reduced is 2.5 l. As a nucleus for the reduction of nickel 125 g. nickel powder is added. In the selective reduction of nickel the pH is adjusted so that it does not rise over 4.8 during the reduction and at the end of the reduction it reaches the value of 4.8. Thus the nickel content of the solution reaches the value of 5 mg./l., and the cobalt content the value of 28 g./l.

The reduced nickel powder contains 1.2% cobalt. The cobalt remaining in the solution is reduced in accordance with Example 1. The nickel content of the reduced cobalt is 0.1%.

EXAMPLE 4

Reduction temperature: 190° C.
Pressure: $p(H_2)=30$ kp./cm.$^2$
Solution to be reduced:
    Co=30 g./l.
    Ni=30 g./l.
    Ca=20 g./l.
    Cl=106 g./l.

The reduction is carried out in the same autoclave as in Example 1. Neutralization is effected with NaOH. The solution to be reduced amounts to 2.5 l. As nucleus for the reduction of nickel 125 g. nickel powder is added. In the selective reduction of nickel the pH is adjusted not to exceed 4.5 during the reduction and to reach the value of 4.5 at the end of the reduction. Then the nickel content of the solution is 300 mg./l. and the cobalt content is 30 g./l. The cobalt content of the reduced nickel powder is 0.03%. The cobalt is reduced from the solution as described in Example 1. In the cobalt powder obtained there is 1% nickel.

We claim:

1. A method of separating metals close to each other in the electromotive series from an aqueous solution which comprises adding to said solution an excess of halide ion to form halide complexes of said metals; adjusting the pH of the solution to such an acidic value that only the reduction of the halide complexes of the metal having the lower reduction potential may occur, subjecting the solution to the action of a reducing gas at an elevated temperature in order to carry out the reduction of said halide complex having the lower reduction potential, simultaneously neutralizing the acid formed to maintain the pH in the same range, recovering the precipitate of the reduced metal, and then raising the pH to at least 5 until the second metal is reduced.

2. Method as recited in claim 1, comprising using chloride as the halide.

3. The method according to claim 2 wherein the chloride concentration is at least 2 moles per liter, and the metals are cobalt and nickel.

4. A method according to claim 2 wherein the pH is originally adjusted to 2.5–3.

5. The method according to claim 2 wherein the pH is adjusted to at least 5 to reduce said second metal.

6. The method according to claim 1 wherein the temperature is 190° C.

7. The method according to claim 1 wherein nickel powder is added at the beginning of the reduction.

References Cited

UNITED STATES PATENTS

| 2,778,728 | 1/1957 | Roy et al. | 75—119 |
| 3,473,920 | 10/1969 | Fitzhugh et al. | 75—109 |
| 1,044,316 | 11/1912 | Wells | 75—119 X |

GEORGE T. OZAKI, Primary Examiner

U.S. Cl. X.R.

75—109, 119, .5 A